April 18, 1950 — R. PIERSON — 2,504,580
AERIAL SPRAYING APPARATUS
Filed June 27, 1946

INVENTOR.
ROLAND PIERSON
BY Edward M. Apple
ATTORNEY

Patented Apr. 18, 1950

2,504,580

UNITED STATES PATENT OFFICE 2,504,580

AERIAL SPRAYING APPARATUS

Roland Pierson, Reedley, Calif.

Application June 27, 1946, Serial No. 679,687

3 Claims. (Cl. 244—136)

This invention relates to spray devices, and has particular reference to an aerial spray suitable for rapidly covering large areas.

An object of the invention is to generally improve devices of the character indicated, and to provide an aerial spraying outfit which is simple in construction, economical to manufacture, and efficient in operation.

Another object of the invention is to provide a power driven spraying device for use with an aeroplane, with controls to effect immediate and positive delivery and shut-off of the spraying compound when flying at a comparatively high speed.

Another object of the invention is the provision of an aerial spray which is driven through a power take-off from the aircraft motor.

Another object of the invention is the provision of a device of the character indicated, which is power driven and effective in delivering a substantially large volume of insecticide during a comparatively short period of time.

Another object of the invention is the provision of a device of the character indicated, which is constructed and arranged in such manner as to break up the spray into a fog like mist.

Another object of the invention is the provision of a device of the character indicated, which is constructed and arranged in such manner as to provide means for keeping the contents of the tank agitated and mixed at all times.

The foregoing and other objects and advantages of the invention will become more apparent as the description proceeds, reference being made from time to time to the accompanying drawings, forming part of the within disclosure, in which drawings.

It will be understood that the invention herein resides in the particular combination and arrangement of parts.

Figure 3:
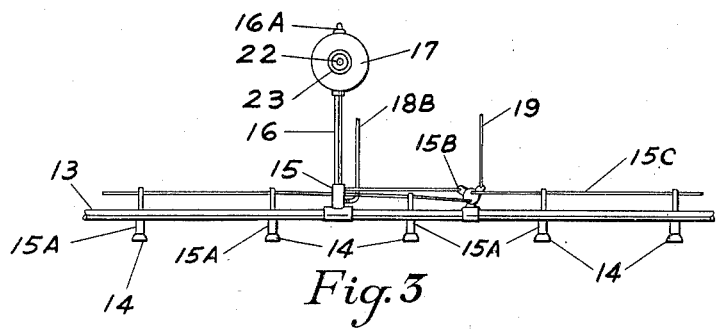
Fig. 3 is an enlarged fragmentary detail showing the distributor head and controls.

Referring now more particularly to the drawings, it will be understood that the reference character 7 indicates the propeller of the aircraft having an engine 8, wings 9 and 10, fuselage 11, and landing gear 12. The distributor head 13 of the spraying device is preferably supported below and in spaced relation with the lower wing 9. A main valve 15 controls the flow of liquid from the pump 17 to the distributor head 13. The distributor head 13 is provided with a plurality of depending nozzles 14 (Fig. 3), each of which is provided with a shut-off valve 15A, all of which valves together with the main valve 15 are controlled simultaneously through control cables 15C and linkage 15B, which is in turn controlled through the rods 19 and 20. This effects rapid and positive shut-off of the spray and prevents dribbling. This is very important because, it prevents the highly concentrated insecticide from dribbling on other property than that intended to be sprayed, while turning around or at the end of a spray run.

Figure 1:
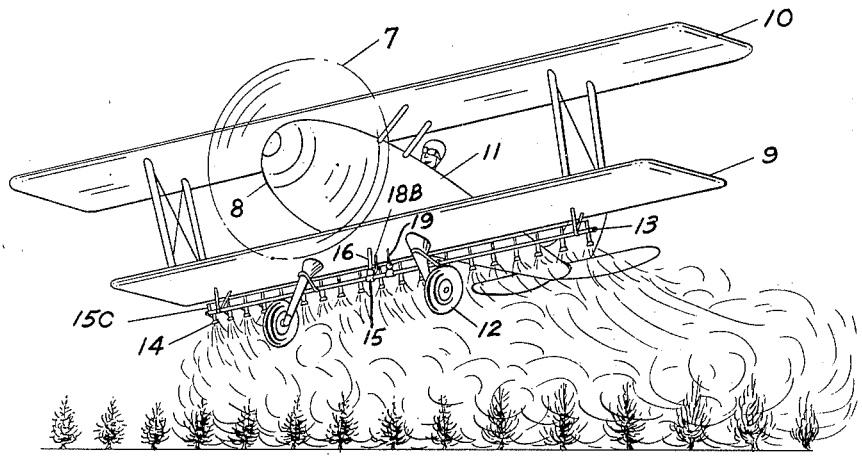
Fig. 1 is a perspective view of an aeroplane equipped with my improved spraying device.
Figure 2:
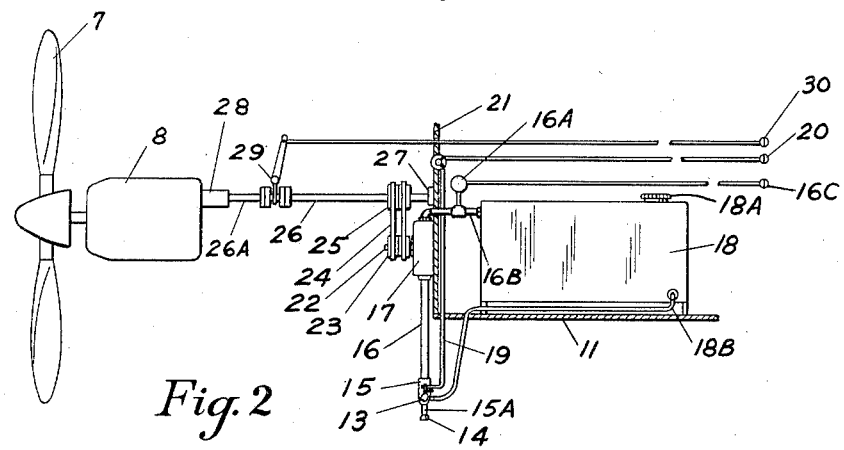
Fig. 2 is a schematic drawing showing the power take-off controls and other elements comprising my device.

The feed line 16 connects the distributor head 13 with the pump 17, and the line 16B connects the pump 17 to the supply tank 18. An air inlet valve 16A is coupled to the intake pipe 16B ahead of the pump 17, and is controlled from the cockpit by a rod 16C. The amount of air used with the liquid determines the supply of liquid to the pump and the air helps to break up the liquid at the spray nozzles. The supply tank 18 (Fig. 2) is provided with a filler inlet 18A, and with a pressure return line 18B, which communicates between the main shut-off valve 15, and the lower rear part of the tank 18, and functions to circulate the liquid and keep the solution properly mixed when the spray is shut off. The shut-off valve 15 is controlled by a rod 19 which extends through the fuselage 11 and is actuated by a control lever 20 extending into the cockpit. The tank 18 is preferably mounted inboard the fire wall 21 of the fuselage 11.

The pump 17 is preferably of a gear or rotary type, and is driven by means of a shaft 22, on which are mounted pulleys 23 adapted to engage the belts 24, which in turn are driven by pulleys 25 mounted on the shaft 26, which is supported at one end in a ball bearing assembly 27, mounted on the outside of the fire wall 21. The shaft 26 is adapted to be driven by the aircraft engine 8 through a special power take-off, or by extending the shaft 26A of the generator 28. The shafts 26 and 26A are adapted to be connected through a suitable clutch 29, which is controlled from the pilot's seat through a clutch control lever 30.

Having described my invention what I claim and desire to secure by Letters Patent is:

1. In a device of the character described including an airplane, a fluid tank, and a distributor head positioned along and in spaced relation with the wing of said plane, the combination of a pump connected to said tank and to said distributor head, a power take off from the engine of the plane for actuating said pump, an air inlet in communication with said pump, a plurality of nozzles spaced on said distributor head, a valve for each nozzle, a shut-off valve for said distributor head, and means for actuating simultaneously said shut-off valve and said nozzle valves.

2. The combination defined in claim 1, including means manually operable from the cockpit of said plane for connecting and disconnecting said power take off.

3. The combination defined in claim 1, including means operable from the cockpit of said plane for controlling the said air inlet.

ROLAND PIERSON.

REFERENCES CITED

The following references are of record in the file of this patent:

UNITED STATES PATENTS

| Number | Name | Date |
|---|---|---|
| 683,630 | Westinghouse | Oct. 1, 1901 |
| 1,619,183 | Bradner et al. | Mar. 1, 1927 |
| 1,997,669 | Arcieri | Apr. 16, 1935 |
| 2,062,511 | Haddock et al. | Dec. 1, 1936 |
| 2,303,856 | Mitchell et al. | Dec. 1, 1942 |
| 2,395,827 | Husman et al. | Mar. 5, 1946 |
| 2,426,771 | Harp | Sept. 2, 1947 |